Oct. 27, 1953  A. J. WILLIAMS, JR  2,657,349
HIGH-SPEED STANDARDIZATION OF POTENTIOMETERS
Filed Jan. 31, 1947  4 Sheets-Sheet 1

INVENTOR
ALBERT J. WILLIAMS, JR.
BY
Woodcock and Phelan
ATTORNEYS

Patented Oct. 27, 1953

2,657,349

UNITED STATES PATENT OFFICE 2,657,349

HIGH-SPEED STANDARDIZATION OF POTENTIOMETERS

Albert J. Williams, Jr., Philadelphia, Pa., assignor to Leeds and Northrup Company, Philadelphia, Pa., a corporation of Pennsylvania Application January 31, 1947, Serial No. 725,466

18 Claims. (Cl. 318—28)

1

This invention relates to measuring systems of the continuously operable high-speed type and has for an object the provision of simple and reliable means and methods for high-speed standardization of the potentiometer-measuring networks utilized in such measuring systems.

During recent years there have been developed measuring systems of the continuously operable high-speed type, an example of which is exemplified in Williams Patent No. 2,113,164 and in which a motor is effectively in continuous operation to maintain the indicating and recording means in synchronism with an unknown potential varying in accordance with the magnitude of a condition to be measured. More specifically, the condition under measurement may be temperature, in which case a thermocouple is connected to a potentiometer-measuring network from which there is derived a fraction of a reference potential selected to equal that developed by the thermocouple. The unidirectional current is converted to alternating current and amplified. After amplification it is applied to control the direction and extent of rotation of a motor arranged relatively to adjust a slidewire and its contact to maintain the potential derived from the measuring network equal to that of the thermocouple.

In potentiometer-measuring networks, a reference potential is produced by controlled flow of current from a battery. Consequently, the reference potential is subject to variations produced by any change of flow of current from the battery. Such a change may be induced by change in temperature of the battery and over long periods of time the voltage of the battery will gradually decrease, requiring a readjustment, such for example as by a variable series-resistor, in order to maintain constant the flow of current into the measuring network.

In the operation of a high-speed indicating and recording instrument of the kind to which the present invention is particularly applicable, advantage is taken of an anticipatory electrical network which includes impedance means for so modifying or controlling in a measuring circuit the difference between an unknown potential and that of a potentiometer to insure the rapid balancing of the measuring circuit without relative over-travel or under-travel between the slidewire and its associated contact. In the preferred form of the anticipatory network, a plurality of capacitors are connected in parallel with the unknown potential and a plurality of resistors are connected in series therewith.

2

In carrying out the present invention in one form thereof, transfer from a measuring operation to a standardizing operation is accomplished while maintaining the previously-attained potential of the anticipatory network during the transfer period, thus avoiding the introduction into the amplifier system of any shock impulses or other spurious signals which would be effective in moving the recorder and indicator to produce false indications on the scale and chart. Moreover, by maintaining the potential on the anticipatory network, it is maintained effective for immediate operation and rapid standardization of the measuring network without relative under-travel or over-travel between the slidewire and movable contact comprising the resistor in series with the battery of the measuring network. In one specific form of the invention, the transfer means is so arranged in the measuring network that when the circuit to the thermocouple is opened, the potential on the anticipatory network is maintained by reason of its continued connection to the measuring network from which a potential is applied to it, which maintains it energized at substantially identically the same potential as when the thermocouple was connected to it.

For a more detailed description of the invention and for further objects and advantages thereof, reference may be had to the accompanying drawings, in which:

Fig. 1-A is a fractional view of the driving discs 63 and 64 illustrated in driving engagement.

Figure 1:
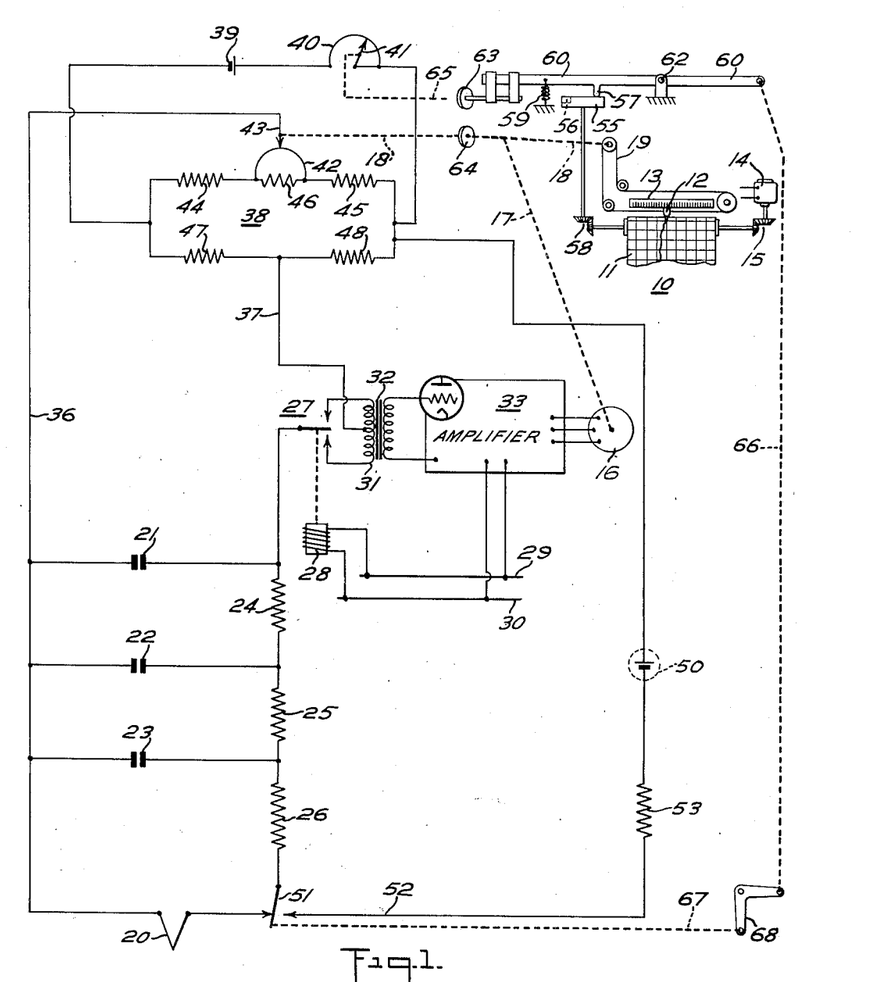
Fig. 1 diagrammatically illustrates a system embodying the invention.

Referring to the drawings, the invention in one form has been shown as applied to an indicating and recording instrument 10, provided with a chart 11 across which there is driven a pen 12 together with an associated scale 13, which has associated therewith an index or pointer, not shown. The strip chart 11 is driven by means of a constant-speed motor 14 through suitable reduction gearing 15. The pen and associated index are driven by means of a motor or transducer 16, the mechanical connection therefrom being indicated by the broken lines 17, 18 and a cable or cord commonly referred to by those skilled in the art as a violin string 19. The motor 16 and the associated system provides a continuously operable high-speed measuring system of the type disclosed in detail in Fig. 4 of the aforesaid Williams Patent No. 2,113,164. In Fig. 4 of that patent a tachometer or small generator is utilized to introduce an anticipatory control.

In the present invention, following the condition-responsive device shown in the form of a thermocouple 20 is an anticipatory or stabilizing network including a plurality of impedance elements, more particularly a plurality of capacitors 21, 22 and 23 connected in parallel across the thermocouple 20 and a plurality of resistors 24, 25 and 26 connected in series with the thermocouple 20. The potential of the thermocouple 20 is applied to a converter 27 which comprises a movable contact operable by a magnet 28 connected to alternating-current supply lines 29 and 30. The movable contact, vibrating at the frequency of the alternating current, alternately engages a pair of stationary contacts respectively connected to opposite ends of a primary winding 31 of a transformer 32. The secondary winding of the transformer is connected to an amplifier 33, one vacuum tube being symbolically illustrated.

The converter 27 applies to the amplifier any difference in potential between that from the anticipatory network and that applied by conductors 36 and 37 leading to the measuring network 38. The measuring network 38 is provided with a suitable source of direct current, such as a battery 39 which, through a series-resistor in the form of a recalibrating slidewire 40 with a relatively adjustable contact 41, is connected to widely separated points of the network 38. This network includes a relatively adjustable measuring slidewire 42 and associated contact 43, on each side of which there may be included series-resistors 44 and 45. There is also shown a resistor 46 connected across the slidewire 42. The measuring network also includes resistors 47 and 48, the resistance of one of which, the resistor 47, varies in resistance with temperature. For a further description of the network itself, reference may be had to Wunsch Patent No. 1,199,724, particularly Fig. 13 thereof.

In operation a variation in temperature of the hot junction of the thermocouple 20 changes the feeble electrical voltage or potential applied by the thermocouple to the anticipatory network. The network and the effect thereon of the velocity of adjustment of the slidewire 42 modifies the voltage developed by the thermocouple 20 and the modified part thereof results in the application to the amplifier 33 of a potential whose magnitude controls the extent of rotation of the motor 16 and whose phase controls the direction of rotation thereof. The motor 16 moves in a direction and to an extent to relatively adjust the slidewire 42 and its associated contact 43 representing an adjustable voltage source which applies to the conductors 36 and 37 a potential which at balance is equal to that developed by the thermocouple 20. When there has been a change in temperature of the thermocouple 20, the relative adjustment between the slidewire 42 and its contact 43 is smoothly and rapidly accomplished by reason of the fact that the change in potential of the thermocouple 20 is so modified in direction and in magnitude by the anticipatory network as such and by the velocity effect thereon of the slidewire that tendency of the motor 16 and of its associated driven elements to over-travel, hunt, or vibrate is eliminated.

All other conditions being the same, for a given setting between the contact 43 and the slidewire 42, the fraction of the reference potential will remain constant at a predetermined value only so long as there is flow of a predetermined current from the battery 39 to the network 38. Inasmuch as the current flow from the battery 39 may vary with its temperature and since the flow of current from the battery 39 will decrease over long periods of time, it has long been found desirable periodically to recalibrate, or standardize the current flow to, the measuring network.

In accordance with the present invention, this is accomplished by applying to the measuring network a calibrating or standardizing voltage, as from a standard cell 50, while maintaining the potential on the anticipatory network during the transfer from measuring to standardizing. This is accomplished by the connection of the anticipatory network by conductors 36 and 37 to the measuring network, whereby the anticipatory network may be subjected to the potential derived from the measuring network 38. In the normal measuring operation the voltage developed by the thermocouple 20 is opposed by the potential derived from the network 38. However, the charge on the capacitors 21—23 will at balance be equal to the voltage of the thermocouple 20 and also equal to the potential across the conductors 36 and 37. Accordingly, a transfer switch 51 may be operated to open the circuit to the thermocouple 20 and to connect the anticipatory network by way of conductor 52 and resistor 53 to the standard cell 50. During this transfer, the potential across conductors 36 and 37 maintains the charge on capacitors 21—23 and there is avoided any change in potential at the converter 27, i. e., switching transients, which would otherwise cause undesired operation of the motor 16 and of the pen 12 and associated index during the transition period.

Figure 1A:
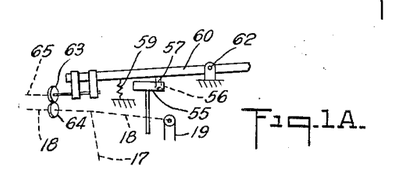

Any suitable means may be provided for operating the transfer switch 51. It may be operated by hand. However, it is preferred to utilize the mechanism described in detail in Ross et al. Patent No. 2,113,069, particularly Fig. 12. Essentially, that motion-transmitting means or mechanism consists of a cam or disc 55 having a peripheral notch or recess 56. The cam 55 is periodically operated to align the recess 56 with a cam-follower 57, as by connection through gearing 58 to the drive of the strip chart 11. When the notch 56 and the cam-follower 57 are in alignment, as shown in Fig. 1-A, a spring 59 rotates a lever 60 about the pivot point 62 to move a disc 63 into engagement with a disc 64 driven by the motor 16. After establishment of the aforesaid mechanical coupling, the disc 63, as indicated by the broken line 65, is thereupon effective relatively to adjust the slidewire 40 and its associated contact 41. At the same time, the lever 60, as indicated by the broken lines 66 and 67 and the crank arm 68, operates the transfer switch 51 to connect the standard cell 50 to the anticipatory network in manner already described. After a brief interval of time, the cam 55, or a second cam, returns the lever 60 and switch 51 to their illustrated positions, thus transferring the network from the standardizing input circuit to the measuring input circuit. The time for the standardizing operation may be, and preferably is, of very short duration, of the order of three seconds, which it may be, due to the continuously operable high-speed balancing system with which it is associated. This is in contrast with standardizing times of the order of thirty seconds or more, necessary for apparatus of the type shown in said Ross et al. Patent No. 2,113,069.

Now that the principles of the invention have been fully explained, it will be understood that many modifications may be made within the scope of the appended claims.

Figure 2:
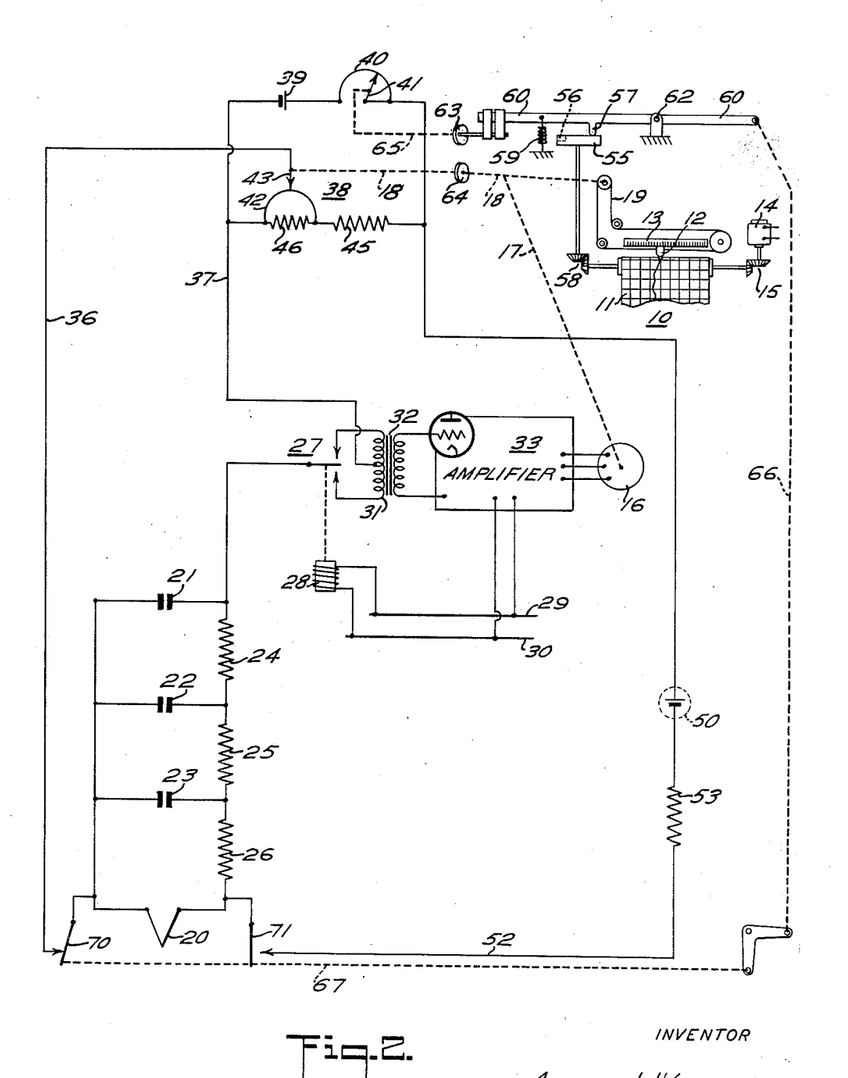
Figs. 2-4 diagrammatically illustrate further modifications each of which embodies the invention.
Figure 3:
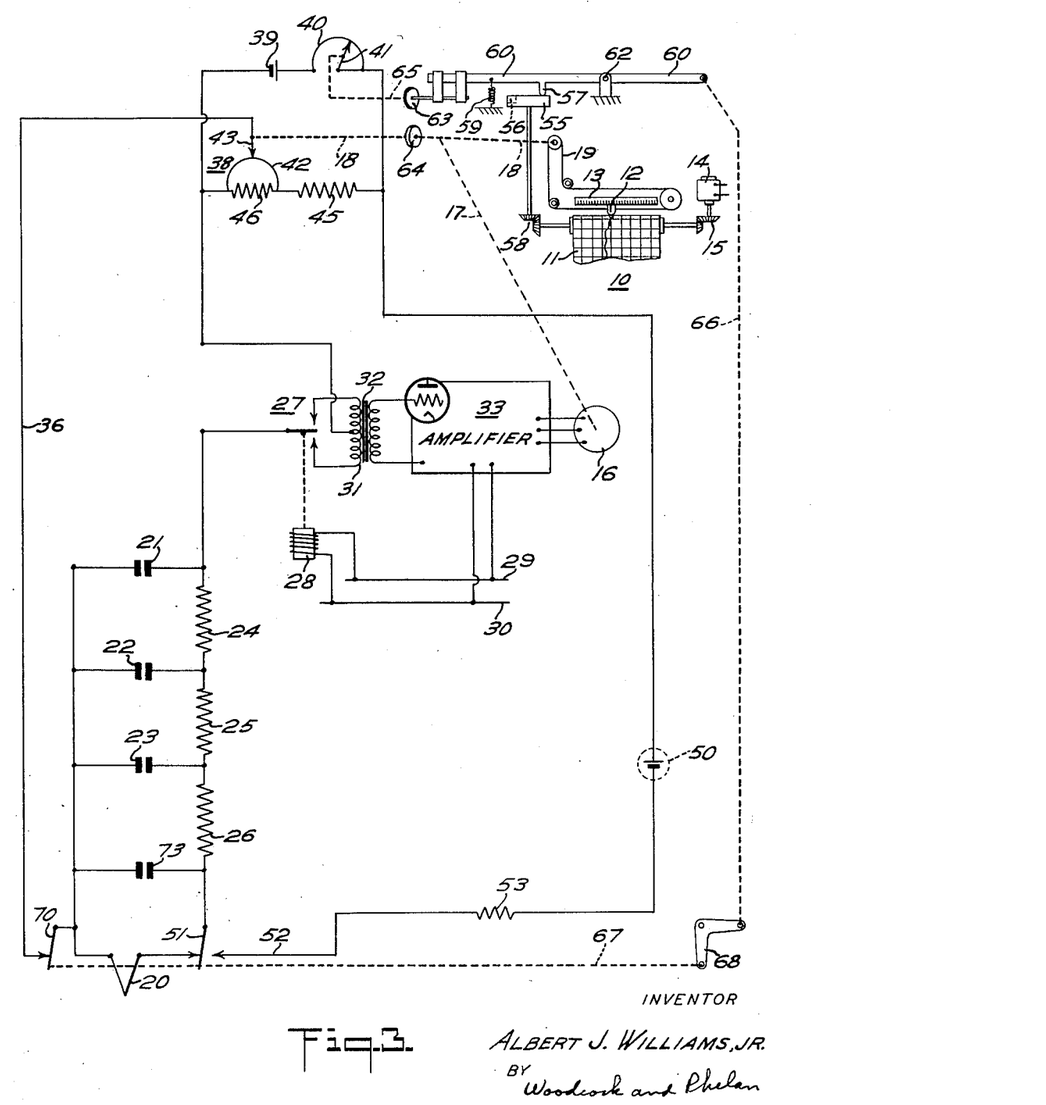
Figure 4:
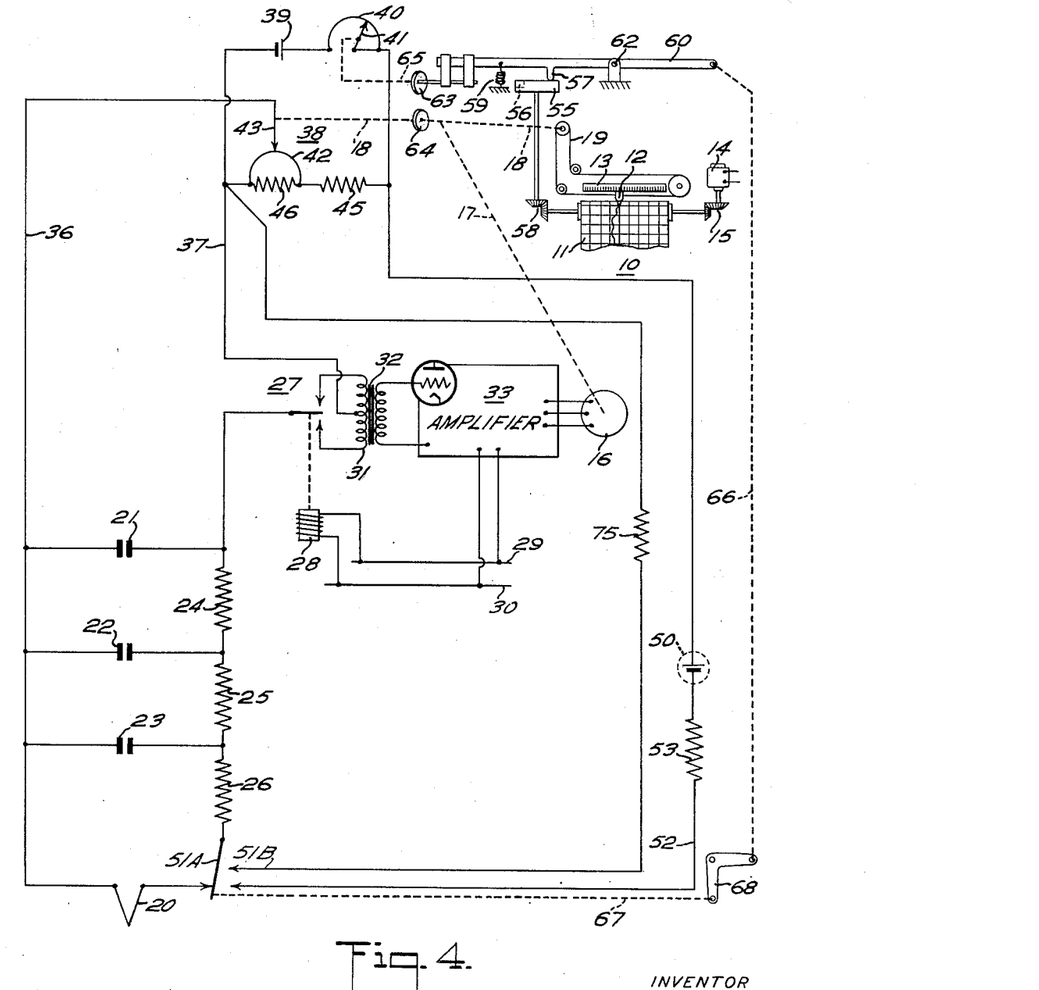

Accordingly, there have been shown in Figs. 2–4 modifications of the invention in which the same reference characters have been used to identify like parts. In Fig. 2, the potentiometer-measuring network has been illustrated in a somewhat simpler form. It comprises the battery 39, the series-resistor or slidewire 40, the measuring slidewire 42 and a resistor 45 in series therewith. If the contact 43 be moved to the right until it engages the end of the slidewire the full reference potential developed by the measuring network 38 will be applied to the conductors 36 and 37. In order to maintain this reference potential at a constant value, the current flow from the battery 39 must be maintained constant. This must be done in order that the fraction of the reference potential applied to the conductors 36 and 37 to equal the voltage developed by the thermocouple 20 will always be the same for a given setting between the contact 43 and the slidewire 42.

Fig. 2 additionally differs from Fig. 1 in that the transfer of the anticipatory network comprising capacitors 21—23 and resistors 24—26 from the measuring operation to the standardizing operation is accomplished by a normally closed switch 70 and a normally open switch 71. These switches are operated in the same manner as the switch 51 of Fig. 1. For the standardizing operation, the switch 71 connects the standard cell 50 to the anticipatory network, while the opening of the switch 70 disconnects the anticipatory network from the slidewire contact 43. The standardizing potential from the cell 50, however, is applied through the low-impedance path of the thermocouple 20 to the anticipatory network and to the converter 27. The potential or charge on the capacitors 21—23 is maintained during the transfer period by reason of the fact they remain connected across the thermocouple 20 and are at all times subject to the voltage developed thereby.

Instead of maintaining the potential on the anticipatory network from the voltage across conductors 36—37 or from the thermocouple 20, a separate source of potential may be utilized as shown in Fig. 3. In this case, a switch 70, like that of Fig. 2, is utilized and the switch 51 of Fig. 1 is utilized in place of the switch 71 of Fig. 2. Accordingly, when both switches move from the measuring position to the standardizing position, the anticipatory network is temporarily disconnected from the remainder of the system. However, by providing a capacitor 73 of substantial size, of the order of fifty microfarads, and one of high quality, preferably oil-paper, and capable of maintaining its charge during the transfer period, the potential or charge on the capacitors 21—23 is maintained during the transfer period. This will be readily understood inasmuch as it is apparent from Fig. 3 that the capacitor 73 is connected directly across the thermocouple 20 and accordingly, at the instant of transfer its potential will be equal to that of the voltage of thermocouple 20.

The modification of Fig. 4 is very similar to the system of Fig. 1 in that the anticipatory network and the switch 51 bear the same relation to each other and to the rest of the system. However, the switch 51A of Fig. 4 is provided with an additional normally open contact 51B for completing a circuit for the standardizing operation from the standard cell 50 through a desensitizing resistor 75 to the conductor 37. By providing the additional circuit through the resistor 75 which preferably has a relatively low resistance, of the order of two hundred ohms, it is possible to utilize as resistor 53 one having a relatively low resistance, of the order of one thousand to ten thousand ohms in contrast with resistance values of fifty thousand to five hundred thousand ohms, which are preferred for the resistor 53 of the modifications of Figs. 1–3. By so reducing the resistance in the standardizing circuit, improved stability is obtained at the conclusion of the standardizing operation and prior to resumption of the measuring operation.

In accordance with the invention, advantage is also taken of the fact that the simultaneous adjustment of the slidewires 40 and 42 by the electro-mechanical means comprising motor 16 and its associated control means is made in such a direction that both are effective to increase or decrease the potential between conductors 36 and 37 during the standardizing operation whereby the effectiveness of the anticipatory network and of damping condenser 21 during standardization is increased. This result is accomplished by arranging the mechanical or electrical connections of the slidewire 40 with respect to its contact 41 so that upon clockwise rotation thereof the output potential of the network 38 will be changed in the same direction as that produced by a counterclockwise adjustment of slidewire contact 43 with respect to slidewire 42. The opposite rotation of slidewire contacts 41 and 43 results from the drive of the disc 63 from the disc 64. If both slidewires 40 and 42 were mounted on the same shaft with a reliable clutching device between the slidewire 40 and the slidewire 42, then they would be connected in the network such that clockwise direction of each relative to its contact would produce the same direction of change of potential between the conductors 36 and 37.

Referring again to Fig. 1 and with the understanding that the following description is likewise applicable, at least in part, to other modifications of the invention, it will be seen that the measuring network 38 comprises a bridge circuit which includes the slidewire resistance 42 and the calibrating resistance 48 which has a pair of terminals. The energizing means comprising the battery 39 is connected to both resistances 42 and 48 and produces an energizing current flow through them. The battery 39 includes a regulator in the form of the slidewire 40 which, of course is adjustable to vary the magnitude of the current flowing through said resistances 42 and 48.

In the system of Fig. 1 there is a standardizing circuit branch which includes the source of standard voltage 50 and the resistance 53 which is larger than the calibrating resistance 48. The switch 51 when operated to its right-hand position connects condensers 21–23 in parallel between the terminals of the calibrating resistance 48. Specifically, one side of condensers 21–23 is connected by conductor 36 by way of slidewire contact 43, the right-hand portion of slidewire 42 and resistor 45 to the right-hand side or to the right-hand terminal of calibrating resistor 48, while the other side of condenser 21 and the corresponding sides of condensers 22 and 23 are connected by way of the converter 27 and by way of conductor 37 to the left-hand side or to the left-hand terminal of calibrating resistor 48.

When the circuit is considered in terms of the foregoing description, then the converter 27 and amplifier 33 comprise a means responsive to current flow between the left-hand terminal of calibrating resistance 48 and the right-hand terminal of one or all of condensers 21–23.

In Fig. 1 as already stated, the resistance 53 in the calibrating circuit is quite high, of the order of from 50,000 ohms to 500,000 ohms, with a resistance value far greater than employed in the bridge circuit 38.

In the foregoing description it will be remembered that the circuit by means of which the condensers 21–23 were connected in parallel with the calibrating circuit branch was traced by way of slidewire contact 43, the right-hand portion of slidewire 42, and resistor 45. The effect of the potential drop in the fixed resistance 45 and the portion of the resistance of slidewire 42 at the right of its contact 43 during a calibrating operation is analogous to that which would be obtained by connecting a dry cell of suitable voltage in series with the condensers 21–23 between the switch member 51 and the right-hand terminal of calibrating resistance 48. Thus, the circuit may be considered as one which includes a source of direct current smaller than the voltage across the calibrating resistance 48, which source is connected in series with said condensers and in parallel with the calibrating circuit branch between the respective terminals thereof and with the voltage of that source (the potential difference across the right-hand portion of resistance 42 and across resistance 45) in bucking relation with the voltage across calibrating resistance 48.

What is claimed as my invention is:

1. In a measuring system of the continuously operable high-speed type in which a reference potential is produced in a potentiometer-measuring network by controlled flow of current from a battery and in which a fraction of said reference potential is selected to equal that of an unknown potential and in which an anticipatory network is normally interposed between said unknown potential and said fraction of said reference potential, the method which comprises standardizing at high speed said reference potential by applying to the measuring network a standardizing voltage, interposing between said standardizing voltage and the measuring network said anticipatory network to prevent over and under-adjustments of the flow of current from said battery, and subjecting said anticipatory network to a source of potential so that it is maintained at a substantially constant potential during transfer from measuring to standardizing.

2. In a measuring system of the continuously operable high-speed type, the combination with a potentiometer-measuring network having a battery, and a variable resistor connected in series therewith, for supplying current to said network, a source of unknown potential, adjustable means for deriving from said network a potential equalling that of said unknown potential, motor means for driving said adjustable means, said motor means and said adjustable means having inertia, means for preventing over-travel of said motor and said adjusting means comprising a plurality of capacitors in shunt to said adjustable means and to the source of unknown potential and a plurality of resistors in series between said source and said adjustable means, amplifying means including a converter for controlling the direction and extent of rotation of said motor, a source of standardizing potential, and circuit-controlling means for connecting said source of standardizing potential to said resistors and capacitors while maintaining potential on said capacitors.

3. The combination with a potentiometer-measuring network having a battery, and a variable resistor connected in series therewith, for supplying current to said network, a relatively adjustable slidewire and contact for deriving from said network a direct-current potential, switching means for connecting to said network a source of unknown potential varying in accordance with the magnitude of a condition to be measured, motor means for relatively adjusting said slidewire and contact until said direct potential equals said unknown potential, said motor means having inertia, means for preventing over-travel of said motor means comprising a plurality of capacitors in shunt to the source of unknown potential and to said adjustable slidewire, a plurality of resistors in series between said source and said slidewire, amplifying means including a converter for controlling the direction and extent of rotation of said motor, of a source of standardizing potential, said switching means having circuit-changing elements for disconnecting said source of unknown potential and for connecting said source of standardizing potential to said resistors and capacitors without interrupting their connection with said measuring circuit, said measuring circuit being effective during operation of said transfer means to maintain the charge on said capacitors.

4. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage balance between them, a stabilizing network at all times electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, both of said slidewires then being mechanically and electrically interconnected to apply voltage variations to said stabilizing network during their simultaneous adjustment by said electromechanical means whereby said stabilizing network is effective also during recalibration of said network.

5. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage balance between them, a stabilizing network including resistors and capacitors at all times electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, both of said slidewires then being mechanically and electrically interconnected to apply voltage variations of like sense to said stabilizing network during their simultaneous adjustment by said electromechanical means whereby said stabilizing network is effective also during recalibration of said network.

6. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage between them, a stabilizing network at all times electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, both of said slidewires then being mechanically and electrically interconnected to apply voltage variations to said stabilizing network during their simultaneous adjustment by said electromechanical means whereby said stabilizing network is effective also during recalibration of said network, said electromechanical means including an amplifier and a desensitizing resistor connectible thereto to reduce the sensitivity thereof to a predetermined extent during said recalibration.

7. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage between them, a stabilizing network at all times electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, both of said slidewires then being mechanically and electrically interconnected to apply voltage variations of like sense to said stabilizing network during their simultaneous adjustment by said electromechanical means whereby said stabilizing network is effective also during recalibration of said network, said electromechanical means including an amplifier and a desensitizing resistor connectible thereto to reduce the sensitivity thereof to a predetermined extent during said recalibration.

8. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage balance between them, means for mechanically coupling said recalibrating slidewire to said electromechanical means for rebalancing adjustment thereof when said second input circuit is connected to said measuring network, a stabilizing network electrically connected to said measuring network for preventing overshoot of said measuring slidewire and of said recalibrating slidewire during their respective aforesaid rebalancing adjustments, and means effective at least during a portion of each operation of said switching means for maintaining upon said stabilizing network a voltage approximating the magnitude and sense of said unknown voltage thereby suppressing switching transients in said system.

9. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage balance between them, a stabilizing network electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, said stabilizing network being connected during said switching operation to a voltage supply comprising a capacitor charged by said unknown voltage during measurement thereof.

10. An automatically standardized self-balancing measuring system comprising a measuring network having a measuring slidewire, a voltage source for said network, a recalibrating slidewire in circuit with said network and said voltage source, a first input circuit connectible to a source of unknown voltage and to said network for automatic measurement of said unknown voltage, a second input circuit including a source of standard voltage connectible to said network for automatic measurement of said standard voltage thereby to recalibrate said network, switching means operable selectively to connect said input circuits to said measuring network, electromechanical means selectively responsive to voltage unbalance between said measuring network and a selected one of said input circuits for effecting a voltage balance between them, a stabilizing network electrically connected to said measuring network for preventing overshoot of said measuring slidewire during its rebalancing adjustment, and means for mechanically coupling said recalibrating slidewire to said electromechanical means for rebalancing adjustment thereof when said second input circuit is connected to said measuring network, both of said slidewires then being mechanically and electrically interconnected to apply voltage variations of like sense to said stabilizing network during their simultaneous adjustment by said electromechanical means whereby said stabilizing network is effective also during recalibration of said network, said electromechanical means including an amplifier and a desensitizing resistor connectible thereto to reduce the sensitivity thereof to a predetermined extent during said recalibration, and said stabilizing network being connected during said switching operation to a voltage supply of the same sense as said unknown voltage thereby suppressing switching transients in said system.

11. An automatically calibrated self-balancing system for measuring a feeble electrical voltage comprising a measuring network including an adjustable slidewire, an adjustable voltage source therefor, a pair of input circuits, and a voltage amplifier and a motion producing transducer operable therefrom, said amplifier and said transducer being responsive to feeble input voltages to produce motion in sensible accordance therewith, said transducer being connected to said slidewire for automatic adjustment thereof, stabilizing means operatively connected to said slidewire to oppose overshooting of said transducer in making said adjustment, motion transmitting means actuatable to connect said stabilized transducer to said adjustable voltage source for simultaneous adjustment thereof and of said slidewire, one of said input circuits being adapted and arranged when connected to said amplifier to apply said voltage to be measured to said network to be balanced with a voltage controllable by adjustment of said slidewire, said amplifier normally being connected to said one input circuit for balancing said slidewire-controlled voltage with said voltage to be measured thereby measuring the latter voltage, a calibrating voltage source connectible to the other of said input circuits, said other input circuit being adapted and arranged when connected thereto to apply said calibrating voltage to said amplifier to be balanced with a voltage controllable by adjustment of said adjustable voltage source, and switching means for selectively connecting said first-mentioned one input circuit or said other input circuit to said amplifier by way of said stabilizing means whereby simultaneous connection of said other input circuit to said amplifier and of said transducer to said adjustable voltage source results in automatic calibration of said measuring network by a stabilized balancing system.

12. Potentiometric measuring apparatus comprising in combination, a bridge circuit including a slide wire resistance, a calibrating resistance having a pair of terminals and energizing means connected to both of said resistances and operative to produce an energizing current flow through said resistances, said energizing means including a regulator adjustable to vary the energizing current flow through said resistances, a standardizing circuit branch including a source of standard voltage and a resistance larger than said calibrating resistance, a condenser, means connecting said condenser and said circuit branch in parallel between the terminals of said calibrating resistance, and means responsive to current flow between said condenser and said calibrating resistance for adjusting said regulator in the direction to eliminate such current flow.

13. In self-balancing potentiometric measuring apparatus, the combination with a bridge circuit including a slide wire resistance having a slider contact, a calibrating resistance having two terminals and energizing means connected to both of said resistances and operative to produce an energizing current flow through said resistances, said energizing means including a regulator adjustable to vary the energizing current flow through said resistances, of a measuring circuit branch including a source of voltage to be measured and having two terminals, first of which is connected to said slider contact, a calibrating circuit branch including a source of standard voltage and having two terminals, a first of which is connected to one terminal of said calibrating resistance, a condenser having one terminal connected to said slider contact and having its second terminal connected to the second terminal of said calibrating resistance, and switch means operable to connect the second terminal of either one or the other of said circuit branches to the second terminal of said calibrating resistance, each of said circuit branches including in series therewith and in series with said switch means at least one resistance.

14. In self-balancing potentiometric measuring apparatus, the combination with a bridge circuit including a slide wire resistance having a slider contact, a calibrating resistance having two terminals, and energizing means connected to both of said resistances and operative to produce an energizing current flow through said resistances, said energizing means including a regulator adjustable to vary the energizing current flow through said resistances, of a measuring circuit branch including a source of voltage to be measured and having two terminals, a first of which is connected to said slider contact, a calibrating circuit branch including a source of standard voltage and having two terminals, a first of which is connected to a first terminal of said calibrating resistance, a condenser having a first terminal connected to said slider contact and having its second terminal connected to the second terminal of said calibrating resistance, switch means operable to connect the second terminal of either of said circuit branches to the second terminal of said calibrating resistance without connecting the last mentioned terminal to the second terminal of the other of said circuit branches, each of said circuit branches including in series therewith and in series with said switch means at least one resistance, and means responsive to current flow between the second terminals of said calibrating resistance and condenser for adjusting said regulator to prevent such current flow.

15. In self-balancing potentiometric measuring apparatus, the combination with a bridge circuit including a slide wire resistance having a slider contact, a calibrating resistance having two terminals, and energizing means connected to both of said resistances and operative to produce an energizing current flow through said resistances, said energizing means including a regulator adjustable to vary the energizing current flow through said resistances, of a measuring circuit branch including a source of voltage to be measured and having two terminals, a first of which is connected to said slider contact, a calibrating circuit branch including a source of standard voltage and having two terminals, a first of which is connected to one terminal of said calibrating resistance, a circuit branch including capacity and providing a high resistance path of flow for direct current and having a first terminal connected to said slider contact and having its second terminal connected to the second terminal of said calibrating resistance, and switch means operable to connect the second terminal of either one or the other of said measuring and calibrating circuit branches to the second terminal of said calibrating resistance, said measuring circuit branch and said calibrating circuit branch each including in series therein and in series with said switch means at least one resistance.

16. Potentiometric measuring apparatus comprising in combination, a bridge circuit including a slide wire resistance, a calbrating resistance, and energizing means connected to both of said resistances and operative to produce an energizing current flow through said resistances, said energizing means including a regulator adjustable to vary the energizing current flow through said resistances, a standardizing circuit branch including a source of standard voltage and a resistance larger than said calibrating resistance, a condenser, conductor means connecting said condenser and said circuit branch to said bridge circuit so that each forms a shunt to a portion of the bridge circuit including said calibrating resistance, and means responsive to current flow between said condenser and said calibrating resistance for adjusting said regulator in the direction to eliminate such current flow.

17. Self-balancing measuring apparatus comprising a bridge circuit including a slide wire resistance, a calibrating resistance having two terminals and energizing means connected to both of said resistances and operative to produce an energizing current flow through said resistances, said energizing means including a current regulator, a slider contact engaging and adjustable along said slide wire resistance, a flow responsive device having two terminals, a first of which is connected to a first terminal of said calibrating resistance, a standardizing circuit branch including a standard cell having two terminals, a first of which is connected to the second terminal of said calibrating resistance, a measuring circuit branch including a source of voltage to be measured and having two terminals, a first of which is connected to said slider contact, switching means operable to connect the second terminal of said flow responsive device interchangeably to the second terminal of said standardizing branch and to the second terminal of said measuring branch, each of said circuit branches including in series therewith and in series with said switching means at least one resistance, mechanism controlled by and operating in selective accordance with the current flow through said device to adjust said regulator when said standardizing branch is connected to said flow responsive device and to adjust said slider contact when said measuring branch is connected to said device, and a damping condenser connected between said slider contact and the second terminal of said flow responsive device.

18. Potentiometric measuring apparatus comprising in combination, a bridge circuit including a slide wire resistance, a calibrating resistance having a pair of terminals and energizing means connected to both of said resistances and operative to produce an energizing current flow through said resistances, said energizing means including a regulator adjustable to vary the energizing current flow through said resistances, a standardizing circuit branch including a source of standard voltage and a resistance larger than said calibrating resistance, a condenser, a source of direct current voltage smaller than the voltage across said calibrating resistance, means connecting said condenser and source in series with one another and in parallel with said circuit branch between the terminals of said calibrating resistance, with the voltage of said source in bucking relation with the voltage across said calibrating resistance, and means responsive to current flow between said condenser and said calibrating resistance for adjusting said regulator in the direction to eliminate such current flow.

ALBERT J. WILLIAMS, Jr.

References Cited in the file of this patent

UNITED STATES PATENTS

| Number | Name | Date |
|---|---|---|
| 2,264,956 | Schmitt | Dec. 2, 1941 |
| 2,300,742 | Harrison et al. | Nov. 3, 1942 |
| 2,367,746 | Williams | Jan. 23, 1945 |
| 2,404,342 | Harrison | July 16, 1946 |
| 2,423,540 | Wills | July 8, 1947 |
| 2,424,146 | Caldwell et al. | July 15, 1947 |
| 2,446,153 | Belcher, Jr. | July 27, 1948 |
| 2,457,791 | Wild | Dec. 28, 1948 |
| 2,489,999 | Cherry | Nov. 29, 1949 |